(12) United States Patent
Appadurai

(10) Patent No.: US 9,052,978 B2
(45) Date of Patent: Jun. 9, 2015

(54) APPLYING HOT FIXES FOR METADATA CUSTOMIZING USER INTERACTIONS BASED ON A SOFTWARE PROGRAM DEPLOYED IN MULTIPLE VERSIONS

(71) Applicant: Oracle International Corporation, Redwood Shores, CA (US)

(72) Inventor: Easwaran Appadurai, Nagercoil (IN)

(73) Assignee: Oracle International Corporation, Redwood Shores, CA (US)

( * ) Notice: Subject to any disclaimer, the term of this patent is extended or adjusted under 35 U.S.C. 154(b) by 55 days.

(21) Appl. No.: 13/949,256

(22) Filed: Jul. 24, 2013

(65) Prior Publication Data

US 2015/0033216 A1    Jan. 29, 2015

(51) Int. Cl.
*G06F 9/44* (2006.01)
*G06F 9/445* (2006.01)

(52) U.S. Cl.
CPC ....................................... *G06F 8/67* (2013.01)

(58) Field of Classification Search
CPC ........................................................ G06F 8/67
USPC ................................................. 717/138–178
See application file for complete search history.

(56) References Cited

U.S. PATENT DOCUMENTS

| 6,594,822 | B1 * | 7/2003 | Schweitz et al. | 717/140 |
| 6,604,236 | B1 * | 8/2003 | Draper et al. | 717/170 |
| 7,860,834 | B2 * | 12/2010 | Meller et al. | 707/638 |
| 2004/0003266 | A1 * | 1/2004 | Moshir et al. | 713/191 |
| 2004/0210607 | A1 * | 10/2004 | Manchanda et al. | 707/203 |
| 2005/0240590 | A1 * | 10/2005 | Shimizu et al. | 707/9 |
| 2010/0281458 | A1 * | 11/2010 | Paladino et al. | 717/106 |

OTHER PUBLICATIONS

Marks, Robert M., "A Metadata Driven Approach to Performing Multi-vendor Database Schema Upgrades," Engineering of Computer Based Systems (ECBS), 2012 IEEE 19th International Conference and Workshops, pp. 108-116, Apr. 11-13, 2012.*

Warren, J.; Clear, M.; McGoldrick, C., "Metadata Independent Hashing for Media Identification; P2P Transfer Optimisation," Cyber-Enabled Distributed Computing and Knowledge Discovery (CyberC), 2012 International Conference, pp. 58-65, Oct. 10-12, 2012.*

Yuan Wang; Mengdong Chen, "Version Control for Metadata in unified database console," Information Science and Service Science and Data Mining (ISSDM), 2012 6th International Conference on New Trends, pp. 580-585, Oct. 23-25, 2012.*

* cited by examiner

*Primary Examiner* — Satish Rampuria
(74) *Attorney, Agent, or Firm* — Narendra Reddy Thappeta

(57) ABSTRACT

An aspect of the present disclosure provides for applying hot fixes to metadata customizing user interactions based on a software program. In an embodiment, a hot fix containing new files is received. Each new file contains a corresponding modified metadata. The user is presented for selection, differences between each new file and a corresponding existing file. Only the selected differences are then used to form patched files, which thereafter control the user interactions, for example, by replacing the corresponding existing file with the patched file. Accordingly the user is provided enhanced control over which of the differences is applied to the metadata.

20 Claims, 9 Drawing Sheets

| | 421 | 422 | 423 | 424 | 425 | 426 | 427 | 428 |
|---|---|---|---|---|---|---|---|---|
| | ID | VER | TYPE | ISJAR | JARNAME | JARPATH | FILENAME | FILEPATH |
| 441 → | 11253 | 46 | SO | 1 | posconfig.jar | \\blr401.acme.com\Ser1\Server\pos\lib\posconfig.jar | application.xml | config\parameter\ |
| 442 → | 11256 | 41 | SO | 1 | posconfig.jar | \\blr401.acme.com\Ser1\Server\pos\lib\posconfig.jar | mock.xml | config\parameter\ |
| 443 → | 11259 | 41 | SO | 1 | posconfig.jar | \\blr401.acme.com\Ser1\Server\pos\lib\posconfig.jar | store.xml | config\parameter\ |
| 444 → | 11270 | 46 | CO | 0 | (null) | \\blr401.acme.com\Reg1\Client\config\ui\bundles\ | posText_en.properties | config\ui\bundles\ |
| 445 → | 11275 | 41 | CO | 0 | (null) | \\blr401.acme.com\Reg1\Client\com\_360commerce\pos\services\sale\ | sale.xml | com\_360commerce\pos\services\sale\ |
| 446 → | 11280 | 46 | CO | 0 | (null) | \\blr401.acme.com\Reg1\Client\com\_360commerce\pos\services\sale\ | saleuicg.xml | com\_360commerce\pos\services\sale\ |

Comparison Tool — 500

510 → N: X:\tors13.1.7\client\patch\10223386_src.zip\application\pos\src\com\_360commerce\pos\services\sale\sale.xml 520 → E: \\blr401.acme.com\Reg1\Client\com\_360commerce\pos\service\sale\sale.xml

```
            record = "OFF"
            index = "ON">
         </ROAD>
         <ROAD
            name="ActivationCancelled"
            letter="ActivationCancelled"
            destination="ShowSlaeScreen"
            tape="ADVANCED"
            record="OFF"
            index="ON">                                540
         </ROAD>
         <ROAD
            name="CompleteSaleQueueFull"
            letter="QueueFull"
            destination="Final"
            tape="ADVANCE"
            record="OFF"
            index="OFF">
         </ROAD>
         <ROAD
            name="CompleteSaleTimeout"
            letter="Timeout"                           550
            destination="SaveCancelTransaction"
            tape="ADVANCE"
            record="OFF"
            index="OFF">
         </ROAD>
      </STATION>
      <STATION
            name="ValidateSaleStation"
            servicename="Sale.validate.validate"
            targettier="APPLICATIONTIER"
            launchshuttle="SaleLaunchShuttle"
            returnshuttle="SaleReturnShuttle">
         <ROAD
            name="ValidationUndo"
            letter="Undo"
```

Right pane (E):

```
            record = "OFF"
            index = "ON">
         </ROAD>
                                                       545
         <ROAD
            name="CompleteSaleQueueFull"
            letter="QueueFull"
            destination="Final"
            tape="ADVANCE"
            record="OFF"
            index="OFF">
         </ROAD>
                                                       555
      </STATION>
      <STATION
            name="ValidateSaleStation"
            servicename="Sale.validate.validate"
            targettier="APPLICATIONTIER"
            launchshuttle="SaleLaunchShuttle"
            returnshuttle="SaleReturnShuttle">
         <ROAD
            name="ValidationUndo"
            letter="Undo"
```

FIG. 5A

APPLYING HOT FIXES FOR METADATA CUSTOMIZING USER INTERACTIONS BASED ON A SOFTWARE PROGRAM DEPLOYED IN MULTIPLE VERSIONS

BACKGROUND OF THE DISCLOSURE

1. Technical Field

The present disclosure relates to enterprise systems and more specifically to applying hot fixes for metadata customizing user interactions based on a software program deployed in multiple versions.

2. Related Art

There are several software programs, which are primarily intended to support user interactions. For example, a point-of-sale (POS) program executing at a retail store may facilitate a cashier (i.e., a person at the POS) to complete a sales transaction by displaying (or in general providing) outputs and receiving appropriate inputs from the cashier. Multiple versions of a software program may be available, and different versions may be deployed at different retail stores. All versions of the same software program implement substantially the same broad functionality, but versions differ in providing enhancements, etc., as is well known in the relevant arts.

Metadata is often used to customize user interactions provided by software programs. Such customizations may be performed, for example, as being necessitated by the requirements of the corresponding usage environment. As an illustration, a software vendor may implement a software program with a generic sequence of user interactions (process flow) for a chain of retail stores and each retail store may further customize the generic process flow as suited for its environment. The customizations are enabled by making corresponding changes to metadata provided external to the software program, such that the programming instructions of the software program are not required to be modified at least for simple customizations.

Hot fixes are often provided by software vendors, for resolving issues observed in process flows. Each hot fix contains modified portions (of the metadata) that have to be applied to replace the corresponding previous portions of the metadata. Post-application, the modified metadata generally operates to resolve an issue previously observed. Hot fixes are normally received in small numbers together targeted towards a small set of issues that are of immediate interest.

Challenges are presented in applying hot fixes to different versions of a software program. A vendor of a software program may generate and make available hot fixes for a specific (typically latest) version and allow the administrators at each retail store to apply hot fixes that are relevant to the version of the software program executing in their retail store. For this reason, as well as requirements that may vary across stores, each administrator may choose different sets of hot fixes at corresponding store, thereby adding to the complexity of applying hot fixes received in subsequent batches.

It is generally desirable that the task of applying hot fixes be simplified, in particular, for metadata customizing user interactions based on a software program deployed in multiple versions.

BRIEF DESCRIPTION OF THE DRAWINGS

Example embodiments of the present disclosure will be described with reference to the accompanying drawings briefly described below.

FIG. 4 illustrates the manner in which identification data is maintained in one embodiment.

FIGS. 5A-5B together illustrates the manner in which differences between a new file and corresponding existing file is presented and a user is enabled to select the desired differences in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure provides for applying hot fixes to metadata customizing user interactions based on a software program. In an embodiment, a hot fix containing new files is received. Each new file contains a corresponding modified metadata. The user is presented for selection, differences between each new file and a corresponding existing file. Only the selected differences are then used to form patched files, which thereafter control the user interactions, for example, by replacing the corresponding existing file with the patched file. Accordingly the user is provided enhanced control over which of the differences is applied to the metadata.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
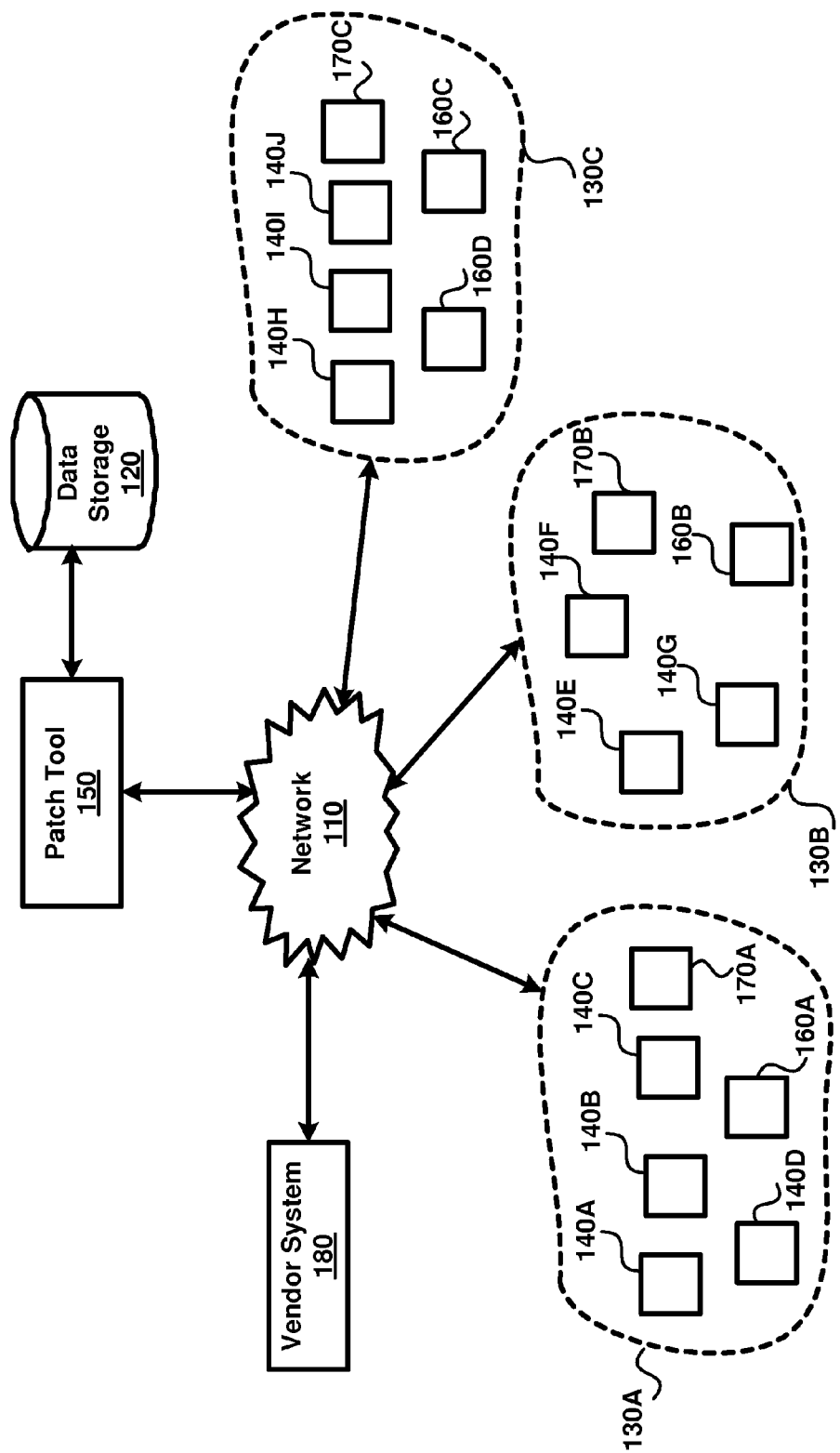
FIG. 1 is a block diagram illustrating an example environment in which several aspects of the present disclosure can be implemented.

FIG. 1 is a block diagram illustrating an example environment in which several aspects of the present disclosure can be implemented. The block diagram is shown containing network 110, data storage 120, retail stores 130A-130C, patch tool 150 and vendor system 180. Retail stores 130A-130C are in turn shown containing corresponding retail systems such as point of sale (POS) terminals 140A-140J, POS servers 160A-160D and data storages 170A-170C.

Merely for illustration, only representative number/type of stores and/or systems is shown in the Figure. Many environments often contain many more stores and/or systems, both in number and type, depending on the purpose for which the environment is designed. Each system/device of FIG. 1 is described below in further detail.

Network 110 provides connectivity between retails systems (such as POS terminals 140A-140J, POS servers 160A-160D and data storages 170A-170C), patch tool 150 and vendor system 180, and may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

A (IP) packet is said to be directed to a destination system when the destination IP address of the packet is set to the (IP) address of the destination system, such that the packet is eventually delivered to the destination system by network 110. When the packet contains content such as port numbers, which specifies the destination application, the packet may be said to be directed to such application as well. The destination system may be required to keep the corresponding port numbers available/open, and process the packets with the corresponding destination ports. Network 110 may be implemented using any combination of wire-based or wireless mediums.

Each of retail stores 130A-130C represents a different (e.g., geographical) location at which one or more retail organizations sell their products (goods and/or services) to potential buyers. For convenience, retail stores 130A-130C are assumed to be operated by the same retail organization, though in alternative embodiments, retail stores 130A-130C may be operated by different retail organizations, and the features of the present invention can be implemented in such embodiments as well.

As is well known, buyers typically (physically) browse the various products available on the shelves at retail stores 130A-130C, select one or more desired products and then make payments for (purchase of) the selected products. Different retail systems are generally provided at the retail store to facilitate buyers to purchase the desired products. Some example retail systems are shown in FIG. 1 and described below in detail, though in alternative embodiments, a retail store may contain more number and/or other types of retail systems, as will be apparent to one skilled in the relevant arts.

Each of data storages 170A-170C (and data storage 120) represents a non-volatile (persistent) storage facilitating storage and retrieval of data by external software programs. For example, data storages 170A-170C facilitate programs executing in other retails systems (e.g. POS terminals 140A-140J and POS servers 160A-160D) to store and retrieve data related to the corresponding retails store such as the details of the products available on the shelves in the retail store, the details of the purchases made in the retail store, etc. Data storage 120 facilitates patch tool 150 to maintain information related the various retails systems in retail stores 130A-130C such as the details of the software programs (and corresponding versions) deployed in each retail system, the details of the hot fixes applied in each retail system, the status of applying the hot fixes to various retail systems, etc.

Some of data storages 170A-170C and data storage 120 may be implemented as a corresponding database server using relational database technologies and accordingly provide storage and retrieval of data using structured queries such as SQL (Structured Query Language). As is well known, database servers store data according to a relational model in the form of tables containing rows and columns, with the SQL queries facilitating the retrieval of data according to such a relational model. Other data storages 170A-170C and data storage 120 may be implemented as a corresponding file server providing storage and retrieval of data in the form of files organized as one or more directories, as is well known in the relevant arts.

Each of POS terminal 140A-140J represents a system such as a personal computer, workstation, mobile phones/stations, computing tablets, specialized POS registers, etc., used by users/cashiers of the retail organization to facilitate buyers to purchase the selected products ("sales transactions"). In general, a POS terminal (such as 140A) receives from a cashier a list of products selected by a buyer as input and then generates a corresponding bill indicating the payment for the list as output. The POS terminal also facilitates the cashier to accept the indicated payment in a convenient form (such as cash, credit card, etc.) and to generate a printed copy of the bill in response to successful payment. The details of the products purchased and corresponding payments made may be stored in a corresponding one of data storages 170A-170C.

Each of POS servers 160A-160D represents a server, such as a web/application server, that facilitates central administration of the POS terminals (and other retail systems, not shown) at the corresponding retail store (130A-130C). For example, a POS server (such as 160A) may enable administrators of the retail organization to view (after retrieving from data storages 170A-170C) the purchases and payments performed at each of the POS terminals located at the corresponding retail store. The POS server (140A) may also enable administrators to modify the configuration of the retail store (such as change the individual prices of the products, specify the details of current offers, etc.), such that the corresponding POS terminals (140A-140D) of the retail store (130A) thereafter operate based on the modified configuration.

It may be appreciated that a retail system (such as a POS terminal or a POS server) may provide suitable user interfaces to a user (such as cashier or administrator) for performing the above noted (and other) user interactions. In one embodiment, software programs executing in the retail systems implement various process flows corresponding to the desired user interactions sought to be supported by the retail systems. In general, each process flow specifies a sequence of user interactions relating to receiving inputs and providing corresponding outputs, while also specifying the additional/external data (such as data stored in data storages 170A-170C) to be used in providing the user interactions. An example of a suite of software programs that implements process flows for user interactions is Oracle Retail Stores Solutions available from Oracle™ Corporation, the intended applicant of the instant application, though various other products available from other organizations also can be used instead.

Vendor system 180 represents a server system that facilitates a software vendor to provide their suite of software programs to various retail organizations (such as the organization operating retail stores 130A-130C). The software programs may be provided to the retail organizations by way of downloading on network 110 or by non-transitory mediums such as optical disks, tape drives, etc. (for example, in response to placing an order using vendor system 180). A software program is generally provided (to the retail organization) with a set of generic process flows (sequence of user interactions) that may be applicable to any retail store.

The generic process flows are then customized as necessitated by the requirements (for example, based on the geographical location, type of product/store, etc.) at the specific retail store (130A-130C) where the software program is sought to be deployed. As noted in the Background section, such customizations of the generic process flows are enabled by making corresponding changes to metadata provided external to the software program (and without modifying the programming instructions constituting the software program).

After deployment of the customized process flows, the retail systems (such as POS terminals 140A-140J and POS servers 160A-160D) located at retail stores 130A-130C operate to support the various user interactions noted above. During such operation, the users/administrators may observe different issues in the user interactions. For example, it may be observed that the computation of the bill is erroneous (for example, the specific taxes to be added to the buyers is not included in the bill), the software program is hanging/crashing resulting in a complete loss of service at the retail system, the payment made by a buyer for a purchase is processed incorrectly for a specific payment method like credit card, the software programs executing in different retail systems are not synchronized with each other, thereby resulting in inconsistent and incorrect data being persisted to the data storages (170A-170C), the software programs are unable to retrieve data corresponding to a purchase.

Software vendors often provide (using vendor system 180) hot fixes for resolving the issues observed in the user interactions. Each hot fix contains modified portions of the metadata that have to be applied to replace the corresponding previous portions of the metadata, such that when the software program is executed post-application, the modified metadata operates to resolve the one or more issues previously observed. As noted in the Background section, the hot fixes are generally deployed when the software program is 'online', that is, the software program is currently executing and is being used by the users (cashiers or administrators) of the retail organization.

It should be noted that software vendors commonly consolidate the previously created hot fixes at regular intervals (e.g., every six months) and release newer versions of the same software program. Newer versions of the software program may also be released for providing additional enhancements (such as support for other payment methods, types of products, types of stores, etc.) to an earlier version of the software program. Thus, multiple versions of the software program may be made available from vendor system 180, with different versions deployed (and executing) in the various retail systems of retail stores 130A-130C.

As noted in the Background section, there are several challenges to applying hot fixes for metadata when multiple versions of a software program are deployed (in retail stores 130A-130C). For example, a software vendor may make available (using vendor system 180) a hot fix for a latest version (e.g., 2.0) of a software program for the POS terminals, when the POS terminals in retail stores 130A and 130B are executing versions 1.0 and 2.0 respectively. The hot fix may include a first modified portion that is applicable for version 1.0 and a second modified portion that is applicable for version 2.0 (and correspondingly version 1.0, assuming backward compatibility of versions is maintained). Accordingly, a user/administrator of each of retail stores 130A and 130B is required to check the modified portions of the hot fix and select only the relevant portions (first portion for version 1.0, and both first and second portions for version 2.0) to be applied to the online software program.

It may be appreciated that such application of hot fixes is laborious, and may consume large amount of resources and/or time. The resource/time requirement is further exacerbated when the number of retail stores in the retail organization and/or the average number of retail systems at each retail store are large (e.g., more than 100). In addition, it may be challenging to a user/administrator to keep track of the different versions of the software programs executing on the different retail systems in the retail stores.

Patch tool 150, provided according to the present disclosure, simplifies the application of hot fixes for metadata customizing user interactions based on a software program deployed in multiple versions, while overcoming at least some of the challenges noted above. Patch tool 150 may be implemented within a separate digital processing system, or provided within one of POS servers 160A-160D. In general, patch tool 150 is implemented based on hardware components such as processor(s) and memory storage(s), executing the appropriate instructions. The manner in which patch tool 150 may simplify application of hot fixes is described below with examples.

3. Applying Hot Fixes for Metadata Customizing User Interactions

Figure 2:
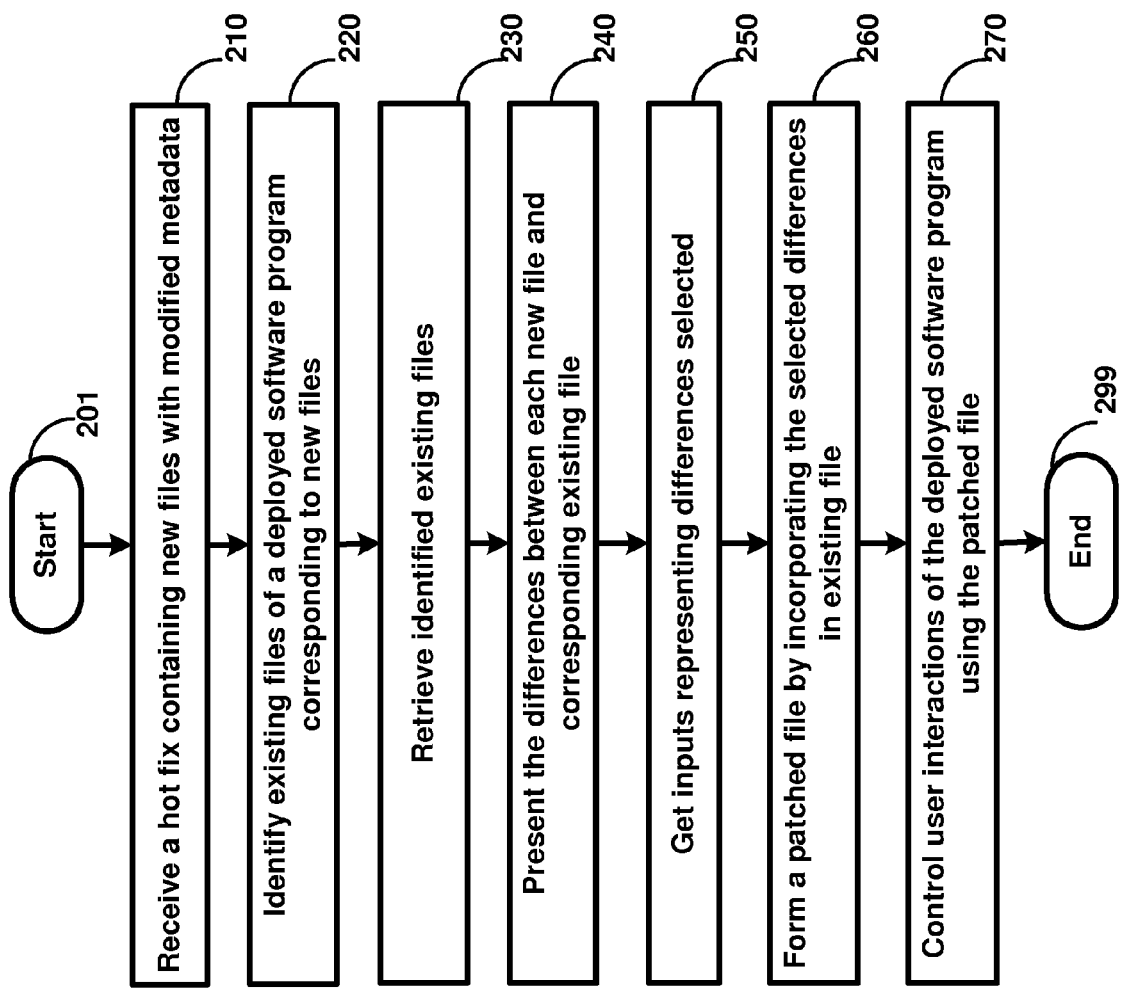
FIG. 2 is a flow chart illustrating the manner in which the application of hot fixes for metadata customizing user interactions, based on a software program deployed in multiple versions, is simplified in one embodiment.

FIG. 2 is a flow chart illustrating the manner in which the application of hot fixes for metadata customizing user interactions, based on a software program deployed in multiple versions, is simplified in one embodiment. The flowchart is described with respect to the systems of FIG. 1, in particular, patch tool 150, merely for illustration. However, the features can be implemented in other systems and environments also without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, patch tool 150 receives a hot fix containing new files with modified metadata. The hot fix may be received from vendor system 180, for example, as part of a batch/bundle of hot fixes. As noted above, the modified metadata may resolve one or more issues observed in a software program during prior user interactions. The details of the specific issues resolved by the modified metadata, a software program for which the hot fix is applicable, the version of the software program based on which the hot fix is created, etc. may also be received along with or as part of the hot fix.

In step 220, patch tool 150 identifies existing files of a deployed software program corresponding to the new files received in the hot fix. In other words, patch tool 150 identifies whether a new file received in the hot fix is applicable to the specific version of the software program deployed in the appropriate retail systems of a retail store (one of 130A-130C). Alternatively, the new files may be compared to the existing files on a specific retail system (as indicated by a user/administrator) on which the hot fix is sought to be applied.

In one embodiment, patch tool 150 maintains (in data storage 120) an identification data indicating the details (such as an identifier containing the name and the path/directory, attributes, etc.) of the files existing on each of the retail systems in retail stores 130A-130C. Patch tool 150 then identifies the existing files as those files having identifiers matching the identifiers of the received new files in the identification data. The matching is performed based on both the path (location) and name of the files.

In step 230, patch tool 150 retrieves the identified existing files of the software program. Each retrieved file contains the previous portions of the metadata sought to be replaced with corresponding modified portions specified in a corresponding new file. The existing files may be retrieved from a specific retail system (such as POS terminals 140A-140J and POS servers 160A-160D) on which the common version is deployed, or specified by the user/administrator in step 220. The retrieval may be performed in a known way, for example, using FTP (File Transfer Protocol).

In step 240, patch tool 150 presents the differences between each new file containing the modified portions and corresponding identified existing file containing the corresponding previous portions. The differences may be presented in any convenient format. For example, the instructions of the new file and the existing file may be displayed alongside each other on a display unit to facilitate comparison of the modified portions with the previous portions. The absence of a previous portion may indicate that the corresponding modified portion is a new portion sought to be added, while the absence of a modified portion may indicate that the corresponding previous portion is sought to be removed.

In step 250, patch tool 150 gets inputs representing differences (between the modified and previous portions) selected by the user/administrator. The user may provide the inputs using input devices such as keyboard, mouse, etc. The user may select the specific differences based on the desired issues sought to be resolved, the version of the software program deployed in the retail system, the previously applied hot fixes in the retail system, etc.

In step 260, patch tool 150 forms a patched file by incorporating the selected differences in the existing file. The incorporation of a selected difference may entail replacing a previous portion with a corresponding modified portion in the existing file, adding a modified portion to the existing file or removing a previous portion from the existing file. The formed patched file contains the result of performing the incorporation of only the differences selected by the user/administrator in step 250.

In step 270, the user interaction of the deployed software program is controlled using the metadata in the patched file. Such controlling may entail sending (for example, using FTP) the patched file to the specific retail system (noted above) and replacing the corresponding existing file in the retail system with the patched file. Accordingly, during the operation of the software program on the specific retail system, the issues (corresponding to the differences selected) in the user interactions are not observed. The flowchart ends in step 299.

It may be appreciated that steps 240, 250, 260 and 270 may be iteratively performed for each (appropriate) identified existing file, thereby enabling the user to selectively apply the hot fix to the software program in the desired retail system. As such, the amount of resources and/or time required for applying the hot fixes to a software program is reduced. By maintaining and using an identification data for applying the hot fixes, the user/administrator is relieved of the burden of keeping track of the different versions of the software program executing on different retail systems in the retail stores.

The manner in which patch tool 150 applies hot fixes for metadata customizing user interactions according to the steps of FIG. 2, is illustrated below with examples.

4. Illustrative Examples

FIGS. 3A-3C, 4 and 5A-5B together illustrates the manner in which the applying of hot fixes for metadata customizing user interactions, based on a software program deployed in multiple versions, is simplified in one embodiment. Each of the Figures is described in detail below.

The description is continued assuming that the hot fixes are to be applied to multiple versions of two software programs, namely, a client program executing in POS terminals 140A-140J and a server program executing in POS servers 160A-160D. The metadata used for customizing the user interactions of the client and server programs are stored in respective existing files. The existing files are deployed in the retail systems as standalone metadata files or as part of an archive file such as a Java Archive (JAR) file, well known in the relevant arts.

Furthermore, one or more issues observed during the user interactions are uniquely identified by a bug number. Each hot fix is accordingly associated with (and uniquely identified by) the bug number whose specific issues are resolved by the hot fix. Each hot fix contains modified metadata portions (in new files) for a specific version (e.g., 13.7.1) of the client program or server program deployed in the retail systems of FIG. 1.

Figure 3A:
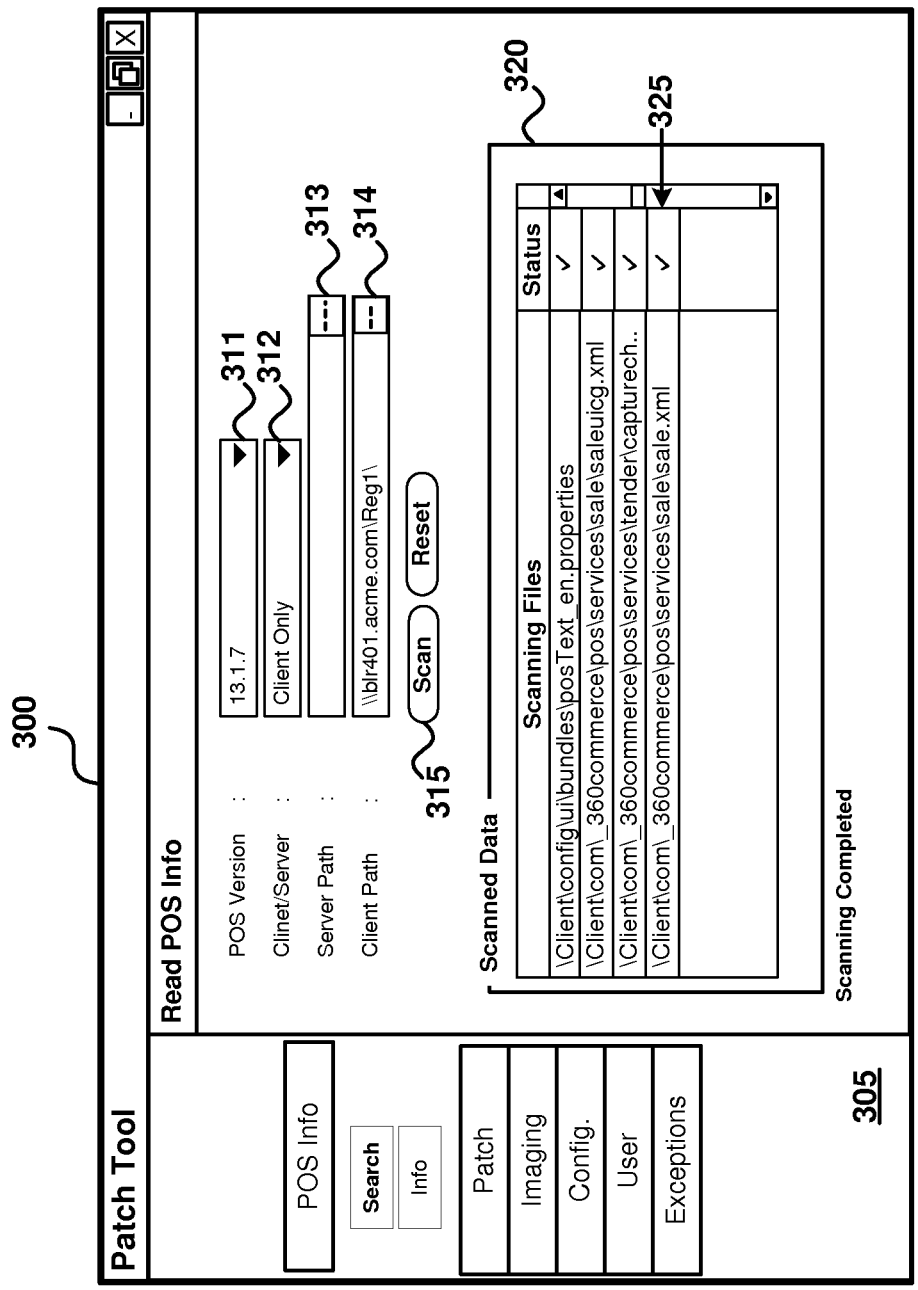
FIG. 3A illustrates the manner in which a user is enabled to collect details of the existing files corresponding to multiple versions of different software programs executing in retail systems in one embodiment.

FIG. 3A illustrates the manner in which a user is enabled to collect details of the existing files corresponding to multiple versions of different software programs executing in retail systems in one embodiment. Each of display areas 300, 330 and 370 (of FIGS. 3A-3C respectively) depicts a corresponding portion of a user interface provided on a display unit (not shown in FIG. 1) associated with patch tool 150. The user interfaces are provided by patch tool 150 in response to receiving appropriate inputs from the user, for example, by selecting the appropriate options in display area 305.

Display area 300 of FIG. 3A enables a user to collect details (such as the identifiers) of the existing files on retail systems in retail stores 130A-130C of FIG. 1. As noted above, each version of a client/server program may have the metadata in different sets of files, and accordingly, it is desirable that the specific existing files containing the metadata of interest be first identified.

Fields 311 and 312 respectively enables the user to specify a version (13.1.7) of the software program and to select whether the software program is the client program or the server program or both (here shown as "Client Only" indicating only the client program). Fields 313 and 314 respectively enables the user to specify the path/URL (universal resource locator) to the POS server on which the server program is executing (if server program or both is selected in field 312), and to specify the path/URL to the POS terminal on which the client program is executing (if client program or both is selected in field 312). Field 314 is shown indicating the URL "\\blr401.acme.com\Reg1" of the POS terminal (e.g., 140A) as specified by the user.

After specifying the desired values for fields 311-314, the user may click/select "Scan" button 315 to collect the information on the existing files on the specified retail system. In response, patch tool 150 connects with the selected retail system (e.g. POS terminal 140A) using protocols such as FTP, collects the details of the existing files on the selected retail system (assuming the existing files are stored in predefined directories of the selected retail system) and stores the information in data storage 120. Display area 320 indicates the identifiers of the existing files identified on the selected retail system and the corresponding status of scanning (the tick mark indicating that the details of the corresponding file has been successfully collected). In particular, display area/row 325 indicates the identifier of an identified existing file as being "\Client\com\_360commerce\pos\services\sale\sale.xml".

Thus, patch tool 150 enables a user to collect details of existing files deployed in desired retail systems in retail stores 130A-130C. The collected details for an existing file may include a unique identifier of the existing file, the identifier of the archive/JAR file containing the existing file, etc. Patch tool 150 then maintains the collected details as part of identification data is described below with examples.

5. Identification Data

FIG. 4 illustrates the manner in which identification data is maintained in one embodiment. For illustration, it is assumed that data storage 120 is implemented as a database server and accordingly the identification data is maintained in the form of table 400 in a database in the database server. However, in alternative embodiments, the identification data may be maintained in any other format such as XML (Extensible Markup Language), as will be apparent to one skilled in the relevant arts by reading the disclosure herein.

Table 400 depicts a portion of identification data maintained in data storage 120 by patch tool 150. Column 421 ("ID") specifies an auto generated number to uniquely identify each row in the table, column 422 ("VER") specifies the version (e.g. 13.1.7) which the corresponding identified existing files belongs to, column 423 ("TYPE") specifies whether the corresponding file belongs to the server program (denoted by SO), the client program (denoted by CO), or both the client and server programs (denoted by CS), column 424 ("ISJAR") specifies whether the file type of the corresponding existing file is JAR (1) or not (0), column 425 ("JARNAME") specifies the name of the existing JAR file (if ISJAR field=1), column 426 ("JARPATH") specifies the path/location of JAR file containing the corresponding existing file (for both JAR and other file types), column 427 ("FILENAME") specifies the name of the corresponding existing file present inside the JAR file and column 428 ("FILEPATH") specifies the path/location of the existing file (starting from the a home directory in the server/terminal). The concatenation of the values in column 428 with those in column 427 forms the unique identifier of the corresponding existing file.

Each of rows 441-446 specifies the details of a corresponding existing file. It may be appreciated that rows 444-446 (indicating existing files for a client program) may be stored by patch tool 150, in response to a user specifying a retail system of interest (such as POS terminal 140A, as noted above) and selecting scan button 325 in display area 300. In particular, it may be observed that the information of the existing file stored in row 445 (such as the identifier "com\_360commerce\pos\service\sale\sale.xml" stored in columns 427 and 428) corresponds to the identifier of the scanned file shown in row 325 of display area 320. The information in other rows may be stored in response to the user/administrator collecting the details of other retails systems using the user interface of FIG. 3A.

Thus, patch tool 150 maintains identification data indicating the identifiers of the existing files on different retail systems in retail stores 130A-130C. The maintained identification data may be later used to identify the existing files corresponding to the new files in a newly received hot fix. The manner in which a user/administrator is facilitated to apply hot fixes for metadata customizing user interactions is described below with examples.

6. Applying Hot Fixes

Figure 3B:
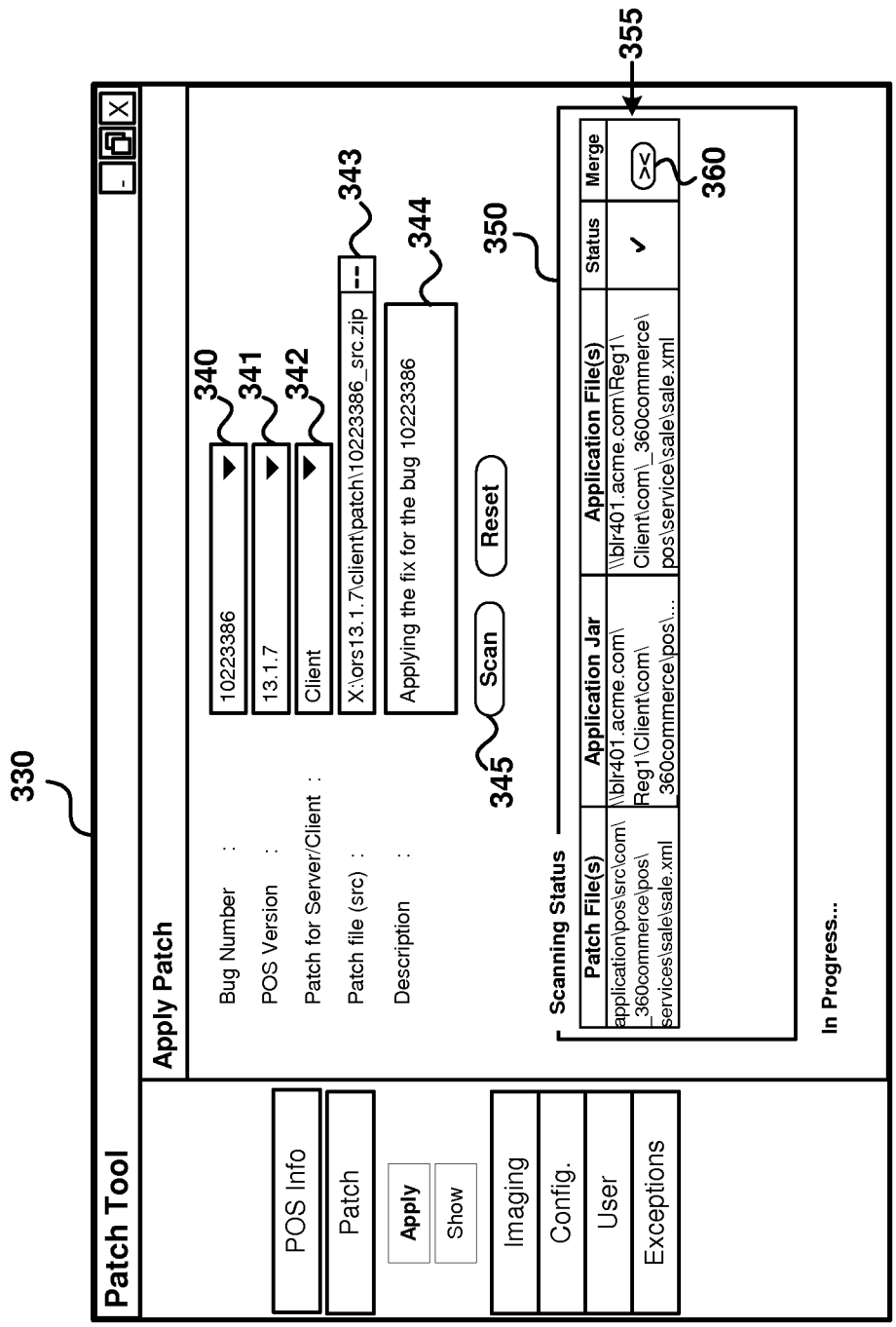
FIG. 3B illustrates the manner in which a user is enabled to apply hot fixes to software programs in one embodiment.

FIG. 3B illustrates the manner in which a user is enabled to apply hot fixes to software programs in one embodiment. In particular, display area 330 enables a user to apply a hot fix (received from vendor system 180) to multiple versions of different software programs executing in retail systems (of FIG. 1). In one embodiment, the user downloads the hot fix from vendor system 180 to a local storage (such as a hard disk) and then uses the interfaces of display area 330 to apply the downloaded hot fix to the desired retail system.

Fields 340-344 respectively enables the user to specify a bug number (10223386) that is resolved by the received/downloaded hot fix, a version of the software program for which the hot fix is applicable (13.1.7), the software program (either client or server) for which the hot fix is applicable (here shown indicating the "Client"), the (local) path/URL to the hot fix ("X:\ors13.1.7\client\patch\10223386_src.zip"), and a description of the hot fix ("Applying the fix for the bug 10223386").

It may be appreciated that though the hot fix is shown as being in the form of an compressed (".zip") file containing one or more new files to be deployed, in alternative embodiments, the hot fix may be received in any other convenient format. Furthermore, though the operation of patch tool 150 is described below with respect to a single hot fix, it may be appreciated that in alternative embodiments, the compressed file may include the modified portions of the metadata corresponding to multiple hot fixes ("hot fix bundle"), with patch tool 150 then applying the modified portions.

After specifying the desired values for fields 340-344, the user may click/select "Scan" button 345 to identify a set of existing files of the client program (deployed on different retail systems in retail stores 130A-130C) that corresponding to the new files in the received hot fix. Patch tool 150, in response to the user selecting button 345, compares the identifier of each new file with the identifiers of the existing files maintained in identification data (400, described above). Each existing file that has an identifier (maintained in identification data) matching any of the identifiers of the new files is included in the identified set of existing files.

Patch tool 150 then displays the identified list of files in display area 350 in the form of a table. Each row in the table indicates the identifier of a new file (column "Patch File(s)"), the identifier of the archive file containing the corresponding existing file (column "Application Jar"), the identifier of the corresponding existing file (column "Application File(s)"), the status of comparison (the tick mark indicating the comparison is completed in column "Status") and a merge button 360 labeled "><" (column "Merge").

In one embodiment, patch tool 150 also retrieves (e.g., using FTP) the matching/identified existing files from the corresponding retail systems, compares the content/metadata contained in the new files and corresponding retrieved existing files, and then displays the table of display area 350. Accordingly, display area 350 indicates that only one existing file (shown in row 355) has been identified as matching a new file received in the hot fix. It may be observed that row 355 corresponds to the existing file in row 445 of identification data 400 and that the identifier of the new file "\com\_360commerce\pos\services\sale\sale.xml" matches the identifier of the existing file "\com\_

360commerce\pos\services\sale\sale.xml" (the prefixed texts indicating the respective paths of the files in different systems).

A user/administrator may select/click merge button 360 to merge the differences between the corresponding new and existing files. In response to a user selecting merge button 360 in a specific row, patch tool 150 presents the differences between the new file and corresponding existing file in the specific row to the user, gets inputs from the user indicating a selected set of differences of the presented differences, and then forms a corresponding patched file by incorporating the selected set of differences in the corresponding existing file (of the specific row). The manner in which patch tool 150 facilitates a user to include desired differences in the existing files is described below with examples.

7. Presenting Differences and Forming Patched Files

Figure 5B:
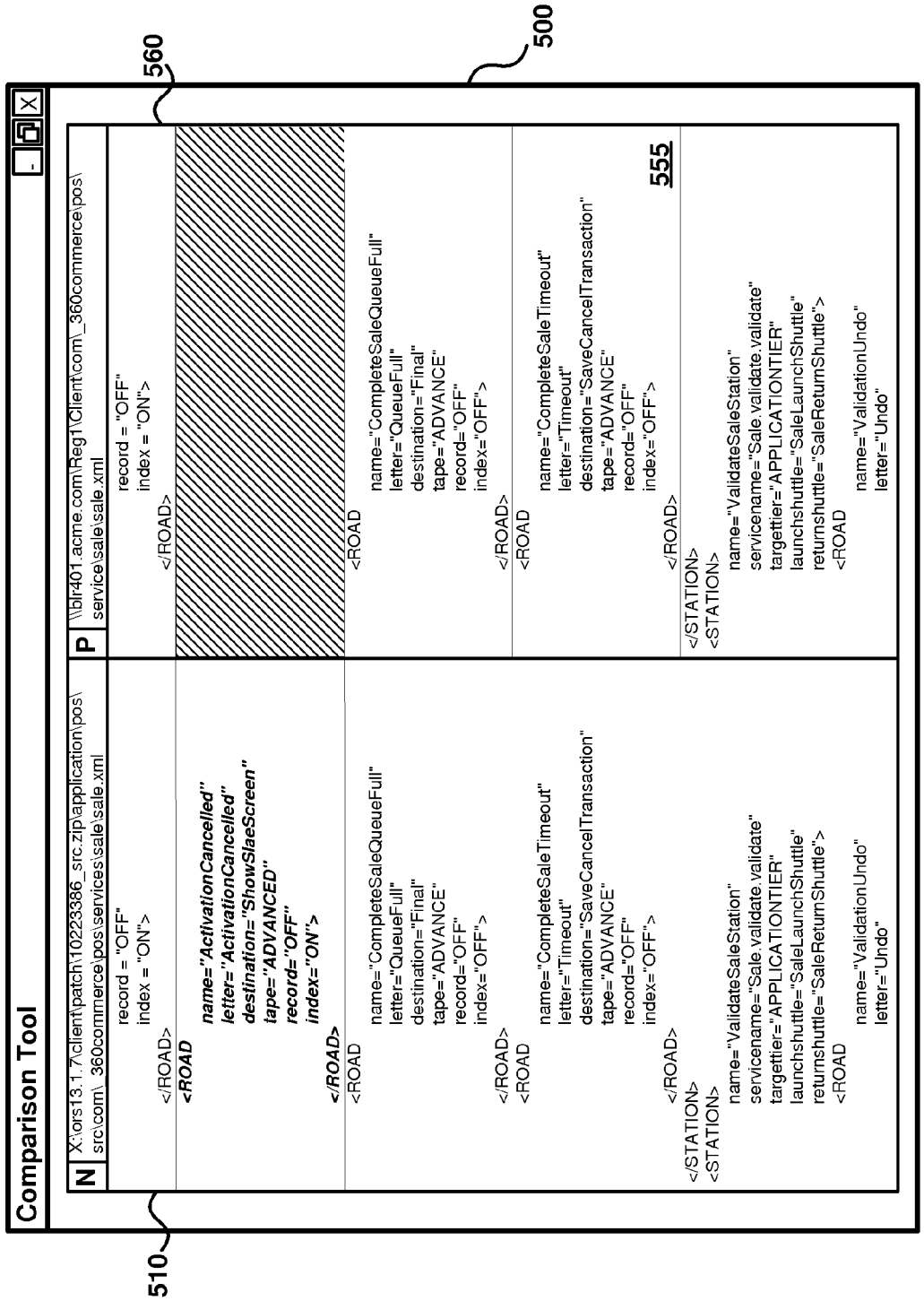

FIGS. 5A-5B together illustrates the manner in which differences between a new file and corresponding existing file is presented and a user is enabled to select the desired differences in one embodiment. Display area 500 (similar to display area 300) depicts a portion of a user interface provided on a display unit (not shown in FIG. 1) associated with patch tool 150. The user interface may be provided by patch tool 150 in response to user selecting merge button 360 in FIG. 3B. Alternatively, patch tool 150 may invoke a file comparison utility (such as the "diff" utility available in Linux like environments) in response to the user selecting merge button 360, with the file comparison utility then providing the user interface of FIGS. 5A-5B, as will be apparent to one skilled in the relevant arts.

Referring to FIG. 5A, display area 500 there is divided into two vertical sections (display areas 510 and 520), with each vertical section displaying the content of a corresponding file of the set of files to be compared and merged. The identifier and the type of file displayed in each section are indicated at the top of the respective section. Thus, display area 510 is shown displaying the content of the new file (as indicated by the type "N"), while display area 520 is shown displaying the content of the existing file (as indicated by the type "E"). It may be observed that the identifiers of the new file (prefixed with the name and path of the hot fix compressed file) and existing file correspond to the identifiers shown in row 355 of display area 350.

Display area 540 depicts a modified portion of the new file that does not have a corresponding previous portion in the existing file (as indicated by corresponding shaded region 545 in display area 520). Thus, the modified portion of display area 540 represents a new metadata portion that is sought to be added to the existing file. The display of display area 540 and shaded region 545 may accordingly be viewed as presenting a difference between the new file and existing file. Similarly, display area 550 depicts another difference between the new file and existing file.

It may be appreciated that other differences such as modifications and deletions may be shown similarly in the user interface of display area 500. For example, to display modifications, the previous portion can be shown in display area 545, with the specific differences in the content of display areas 540 and 545 being highlighted using a convenient convention (e.g., strikethrough to show deleted text and underline to show the newly added text). To display deletions, the shaded regions (such as display area 545) may be provided in display area 510 corresponding to the previous portions in the existing file that have to be removed.

Thus, patch tool 150 presents the differences between a new file and corresponding existing file to a user/administrator. The user may then indicate the desired differences to be merged/incorporated into the existing file. The indication may be provided in any convenient manner, for example, by the user using a mouse to select the display areas (540 and/or 550) corresponding to the differences of interest. The description is continued assuming that the user has selected display area 550 (difference D2) and not selected display area 540 (difference D1).

In response getting the selections as inputs, patch tool 150 (or the file comparison utility) incorporates only the selected differences in the existing file to form a patched file. As such, the patched file is formed by incorporating the difference D2 and not the difference D1. Accordingly, user is enabled to selectively incorporate only the desired modified portions of a hot fix into the existing metadata files of a software program.

Referring to FIG. 5B, display area 500 there shows the result of incorporating the user selected differences (D2/550) in the existing file. Display area 560 is shown displaying the content (and also the identifier) of the patched file (as indicated by the type "P") formed by incorporating the user selected first difference (D2 of display area 550). The identifier of the patched file is indicated to be the same as the identifier of the existing file. It may be observed that display area 555 is now similar to display area 550 and is accordingly not highlighted as a difference between the two files. However, the difference D1 (of display area 540) is presented as a difference between the two files.

Referring again to FIG. 3B, after forming a desired set of patched files by merging each of the new files in the received hot fix and corresponding existing files on a specific retail system (POS terminal 140A), patch tool 150 deploys automatically (i.e., without requiring human intervention) the newly formed patched files to the specific retails system (POS terminal 140A).

After deployment, the user interactions performed by the software program (that is, version 13.1.7 of the client program) on the specific retail system (POS terminal 140A) is controlled based on the deployed set of patched files, instead of the previous set of existing files. Accordingly, during the user interactions, the previously observed issues as identified by bug number 10223386 (and resolved by the received hot fix) may not be observed.

An aspect of the present invention facilitates the distribution of the deployed patched files (and accordingly the applied hot fix) from the specific retail system to other (similar) systems in the retail stores. The manner in which patch tool 150 facilitates the distribution of the patched files is described below with examples.

8. Distributing Patched Files

Figure 3C:
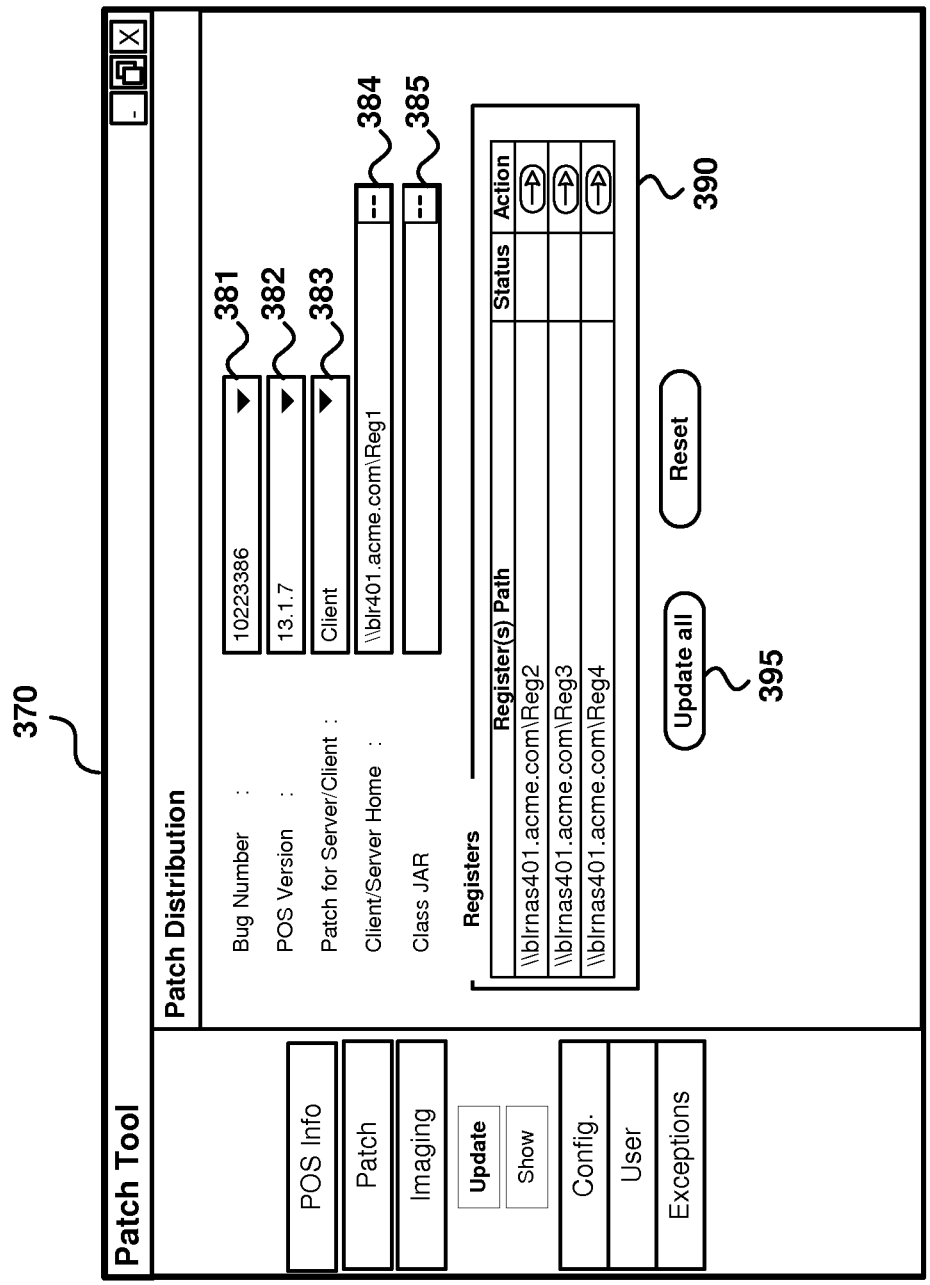
FIG. 3C illustrates the manner in which a user/administrator is enabled to apply/deploy patched files (applied with a hot fix) to multiple retail systems in one embodiment.

FIG. 3C illustrates the manner in which a user/administrator is enabled to apply/deploy patched files (applied with a hot fix) to multiple retail systems in one embodiment. In particular, display area 370 enables the user to apply/deploy a set of patched files to retail systems (such as POS terminals 140A-140J and POS servers 160A-160D) in retail stores 130A-130C. The user may use the interface of display area 370 after first forming and deploying a set of patched files to a specific retail system (POS terminal 140A) using the interface of display area 330.

Fields 381-385 respectively enables the user to specify a bug number (10223386) that is resolved by the set of patched files, a version of the software program for which the set of patched files is applicable (13.1.7), the software program (either client or server) for which the set of patched files is applicable (here shown indicating the "Client"), the path/URL to the retail system deployed with the set of patched files ("\\blrnas401.idc.acme.com\Reg1"), and the path/URL to a specific archive file containing the set of patched files. It may be observed that field 384 is shown indicating the URL "\blrnas401.idc.acme.com\Reg1" of the POS terminal (e.g., 140A) previously applied/deployed with the hot fix for the same bug number.

In response to a user specifying the desired values for fields 381-385, a list of retail systems to which the patched files can be deployed is shown in display area 390. The list of retail systems may be identified by patch tool 150 based on the bug number (field 381), specific version (field 382) and software program (field 383) specified by the user. A user may then click on the corresponding button (labeled "->") shown in column "Action" of a desired row to cause deployment of the patched files (retrieved from the POS terminal 140A) to the corresponding retail system of the row. The user may also select "Update All" button 395 to cause deployment of the patched files to all the retail systems in the list of display area 390.

Thus, the user interface of FIGS. 3A-3C enable a user/administrator to collect and maintain details of a retail system of interest (e.g., POS terminal 140A) executing a desired version of a software program (display area 300), selectively apply a received hot fix to the retail system of interest (display area 330) and thereafter distribute the patched file (and accordingly the applied hot fix) to similar systems of interest (such as POS terminals 140B-140J) in the retail stores. As such, the amount of resources and/or time required for applying the hot fixes to a software program is reduced.

It should be appreciated that the features described above can be implemented in various embodiments as a desired combination of one or more of hardware, executable modules, and firmware. The description is continued with respect to an embodiment in which various features are operative when executable modules are executed.

9. Digital Processing System

Figure 6:
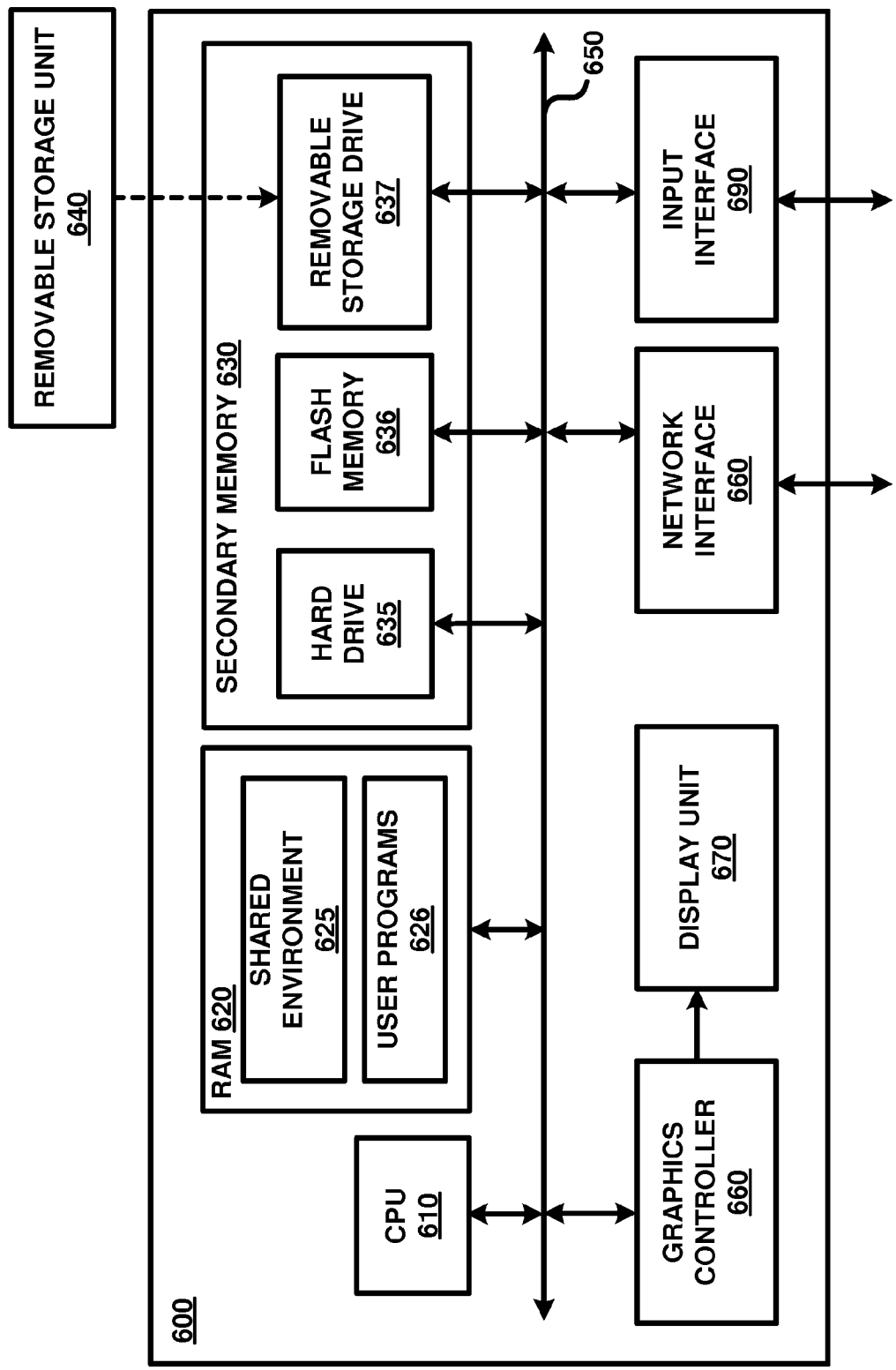
FIG. 6 is a block diagram illustrating the details of a digital processing system in which various aspects of the present disclosure are operative by execution of appropriate software instructions.

FIG. 6 is a block diagram illustrating the details of a digital processing system (600) in which various aspects of the present disclosure are operative by execution of appropriate executable modules. Digital processing system 600 may correspond to patch tool 150.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path (bus) 650, which may contain several buses as is well known in the relevant arts. The components of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting shared environment 625 and/or user programs 626 (such as client applications, browsers, etc.). Shared environment 625 includes operating systems, device drivers, virtual machines, etc., which provide a (common) run time environment for execution of user programs 626.

Graphics controller 660 generates display signals (e.g., in RGB format) to display unit 670 based on data/instructions received from CPU 610. Display unit 670 contains a display screen to display the images defined by the display signals (such as the portions of the user interfaces shown in FIGS. 3A-3C and 5A-5B). Input interface 690 may correspond to a keyboard and a pointing device (e.g., touch-pad, mouse) and may be used to provide inputs (such as those provided using the portions of the user interfaces shown in FIGS. 3A-3C and 5A-5B). Network interface 680 provides connectivity to a network (e.g., using Internet Protocol), and may be used to communicate with other systems (such as those shown in FIG. 1) connected to the network.

Secondary memory 630 represents a non-transitory machine readable storage medium, and may store data (e.g., portions of the data shown in FIG. 4) and software instructions (e.g., for performing the actions noted above with respect to FIG. 2) which enables system 600 to provide several features in accordance with the present disclosure. The code/instructions stored in secondary memory 630 may either be copied to RAM 620 prior to execution by CPU 610 for higher execution speeds, or may be directly executed by CPU 610.

Secondary memory 630 may contain hard drive 635, flash memory 636, and removable storage drive 637. Some or all of the data and instructions may be provided on removable storage unit 640, and the data and instructions may be read and provided by removable storage drive 637 to CPU 610. Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of providing user interactions based on a software program, said method being performed at least in part in a digital processing system, comprising:
   executing said software program to provide said user interactions, wherein said user interactions are in the form of process flows, wherein said process flows specify receiving inputs from a program user and providing corresponding outputs, wherein said user interactions constituting said process flows are operative according to an original metadata stored in the form of a plurality of existing files;
   receiving a hot fix containing a plurality of new files, each new file containing a corresponding modified metadata;
   identifying a set of existing files of said plurality of existing files, wherein each of said set of existing files corresponds to a new file of said plurality of new files;
   retrieving each of said set of existing files from a secondary storage;
   presenting to an administrator on a display unit, differences between each of said set of existing files and said corresponding new files, wherein said differences correspond to differences between original metadata in said existing files and modified metadata in the corresponding new files;
   getting inputs from said administrator indicating a selected set of differences of the presented differences, wherein said inputs are provided by said administrator by selecting said selected set of differences from said differences displayed on said display unit;
   forming a set of patched files, each patched file being formed by incorporating the selected differences in a corresponding existing file of said set of existing files,
   wherein said identifying, said retrieving, said presenting, said getting and said forming are performed for each of said plurality of new files in response to said receiving; and
   controlling, after said forming, said user interactions based on said set of patched files instead of said set of existing files.

2. The method of claim 1, wherein said presenting displays a first difference and a second difference between a first new file of said plurality of new files and a first existing file of said set of existing files,
   wherein said inputs from said administrator indicate only said first difference, but not said second difference, in said selected set of differences,
   wherein said forming forms a first patched file of said set of patched files by incorporating said first difference, but not said second difference, in said first existing file,
   wherein said controlling controls said user interactions based on said first patch file containing said first difference, but not said second difference.

3. The method of claim 2, wherein said controlling comprises replacing each of said identified existing files with a corresponding patched file of said plurality of patched files in said secondary storage,
   wherein said replacing replaces said first existing file with said first patched file.

4. The method of claim 3, further comprising:
   maintaining identification data indicating the identifiers of each of said plurality of existing files, wherein each of said plurality of new files is also identified by a corresponding identifier,
   wherein said identifying identifies said set of existing files as having identifiers matching the identifiers of said plurality of new files in said identification data.

5. The method of claim 4, wherein said software program is executing on a first system external to said digital processing system, wherein said first system contains said secondary storage,
   wherein said retrieving retrieves said set of existing files from said first system,
   wherein said replacing replaces said set of existing files with said set of patched files in said first system.

6. The method of claim 1, wherein said software program is available in a set of versions, wherein multiple instances of said software program are executing on a plurality of systems external to said digital processing system,
   wherein a first system executing a first version is operable based on a first file storing corresponding portion of metadata, said first file being identified by a first identifier,
   wherein a second system executing a second version does not contain any files with said first identifier in the corresponding plurality of existing files,
   wherein, in response to said hot fix containing a new file having said first identifier, all of said identifying, said retrieving, said presenting, said getting and said forming are performed when said hot fix is applied to said first system based on matching of said first identifier, and not performed when said hot fix is applied to said second system.

7. The method of claim 6, each of said first system and said second system corresponds to a POS (point of sale) terminal of a plurality of POS terminals in a retail store, wherein said software program corresponds to a client application executing in said plurality of POS terminals, wherein said first file stores said corresponding portions of metadata according to XML (extensible markup language).

8. A non-transitory machine readable medium storing one or more sequences of instructions for enabling a system to apply hot fixes to software programs, wherein execution of said one or more instructions by one or more processors contained in said system enables said system to perform the actions of:

receiving a hot fix containing a plurality of new files, each new file containing a modified metadata corresponding to an original metadata, said original metadata being stored in the form of a plurality of existing files, wherein upon execution, a software program provides user interactions customized based on said original metadata;

identifying a set of existing files of said plurality of existing files, wherein each of said set of existing files corresponds to a new file of said plurality of new files;

retrieving each of said set of existing files from a secondary storage;

presenting to an administrator on a display unit, differences between each of said set of existing files and said corresponding new files, wherein said differences correspond to differences between original metadata of said existing files and modified metadata of the corresponding new files, wherein said presenting displays a first difference and a second difference between a first new file of said plurality of new files and a first existing file of said set of existing files;

getting inputs from said administrator indicating a selected set of differences of the presented differences, wherein said inputs are provided by said administrator by selecting said selected set of differences from said differences displayed on said display unit, wherein said inputs from said administrator indicate only said first difference, but not said second difference, in said selected set of differences; and forming a set of patched files, each patched file being formed by incorporating the selected differences in a corresponding existing file of said set of existing files, wherein said forming forms a first patched file of said set of patched files by incorporating said first difference, but not said second difference, in said first existing file, wherein said identifying, said retrieving, said presenting, said getting and said forming are performed for each of said plurality of new files in response to said receiving, wherein after said forming, said user interactions of said software program are controlled based on said first patch file containing said first difference, but not said second difference, instead of said set of existing files.

9. The machine readable medium of claim 8, further comprising one or more instructions for:

replacing each of said identified existing files with a corresponding patched file of said plurality of patched files in said secondary storage, wherein said replacing replaces said first existing file with said first patched file.

10. The machine readable medium of claim 9, further comprising one or more instructions for:

maintaining identification data indicating the identifiers of each of said plurality of existing files, wherein each of said plurality of new files is also identified by a corresponding identifier, wherein said identifying identifies said set of existing files as having identifiers matching the identifiers of said plurality of new files in said identification data.

11. The machine readable medium of claim 10, wherein said software program is executing on a first system external to said digital processing system, wherein said first system contains said secondary storage, wherein said retrieving retrieves said set of existing files from said first system, wherein said replacing replaces said set of existing files with said set of patched files in said first system.

12. The machine readable medium of claim 8, wherein said software program is available in a set of versions, wherein multiple instances of said software program are executing on a plurality of systems external to said digital processing system, wherein a first system executing a first version is operable based on a first file storing corresponding portion of metadata, said first file being identified by a first identifier, wherein a second system executing a second version does not contain any files with said first identifier in the corresponding plurality of existing files, wherein, in response to said hot fix containing a new file having said first identifier, all of said identifying, said retrieving, said presenting, said getting and said forming are performed when said hot fix is applied to said first system based on matching of said first identifier, and not performed when said hot fix is applied to said second system.

13. The machine readable medium of claim 12, each of said first system and said second system corresponds to a POS (point of sale) terminal of a plurality of POS terminals in a retail store, wherein said software program corresponds to a client application executing in said plurality of POS terminals, wherein said first file stores said corresponding portions of metadata according to XML (extensible markup language).

14. The machine readable medium of claim 8, wherein said user interactions are in the form of process flows, wherein said process flows specify receiving inputs from a program user and providing corresponding outputs, wherein said user interactions constituting said process flows are operative according to said original metadata stored in the form of said plurality of existing files.

15. A computing system comprising:

a plurality of systems to execute multiple instances of a software program, wherein each of said plurality of systems contains (a) a corresponding memory to store instructions, and (b) a corresponding processor to retrieve said instructions from said memory and execute the retrieved instructions, wherein execution of said retrieved instructions causes said system to provide an instance of said multiple instances of said software program, and wherein said software program upon execution provides user interactions, wherein said user interactions are in the form of process flows, wherein said process flows specify receiving inputs from a program user and providing corresponding outputs, wherein said user interactions constituting said process flows are operative according to an original metadata stored in the form of a plurality of existing files; and a patch tool operable to:
- receive a hot fix containing a plurality of new files, each new file containing a corresponding modified metadata;
- identify a set of existing files of said plurality of existing files, wherein each of said set of existing files corresponds to a new file of said plurality of new files;
- retrieve each of said set of existing files from a first system of said plurality of systems;
- present to an administrator on a display unit, differences between each of said set of existing files and said corresponding new files wherein said differences correspond to differences between original metadata in said existing files and modified metadata in the corresponding new files;
- get inputs from said administrator indicating a selected set of differences of the presented differences, wherein said inputs are provided by said administrator by selecting said selected set of differences from said differences displayed on said display unit;
- form a set of patched files, each patched file being formed by incorporating the selected differences in a corresponding existing file of said set of existing files,
- wherein said patch tool performs said identify, said retrieve, said present, said get and said form for each of said plurality of new files in response to receiving said hot fix,
- after said forming, wherein said user interactions of said software program executing on said first system are controlled based on said set of patched files instead of said set of existing files.

16. The computing system of claim 15, wherein to said present, said patch tool displays a first difference and a second difference between a first new file of said plurality of new files and a first existing file of said set of existing files,
- wherein said inputs from said administrator indicate only said first difference, but not said second difference, in said selected set of differences,
- wherein said patch tool forms a first patched file of said set of patched files by incorporating said first difference, but not said second difference, in said first existing file,
- wherein said user interactions of said software program executing on said first system are based on said first patch file containing said first difference, but not said second difference.

17. The computing system of claim 16, wherein said patch tool is further operable to:
- replace each of said identified existing files with a corresponding patched file of said plurality of patched files in said first system,
- wherein said patch tool replaces said first existing file with said first patched file.

18. The computing system of claim 17, wherein said patch tool is further operable to:
- maintain identification data indicating the identifiers of each of said plurality of existing files, wherein each of said plurality of new files is also identified by a corresponding identifier,
- wherein said patch tool identifies said set of existing files as having identifiers matching the identifiers of said plurality of new files in said identification data.

19. The computing system of claim 15, wherein said software program is available in a set of versions,
- wherein said first system executing a first version is operable based on a first file storing corresponding portion of metadata, said first file being identified by a first identifier,
- wherein a second system of said plurality of systems executing a second version does not contain any files with said first identifier in the corresponding plurality of existing files,
- wherein, in response to said hot fix containing a new file having said first identifier, said patch tool performs said identify, said retrieve, said present, said get and said form when said hot fix is applied to said first system based on matching of said first identifier, and not performed when said hot fix is applied to said second system.

20. The computing system of claim 19, wherein said patch tool is further operable to:
- receive a request to distribute said hot fix to a set of systems of said plurality of systems; and
- in response to said request, replace said set of existing files in each of said plurality of systems with said set of patched files,
- wherein said user interactions of said software program executing on said set of systems are controlled based on said set of patched files instead of said set of existing files after said replacement.

* * * * *

UNITED STATES PATENT AND TRADEMARK OFFICE
CERTIFICATE OF CORRECTION

PATENT NO. : 9,052,978 B2
APPLICATION NO. : 13/949256
DATED : June 9, 2015
INVENTOR(S) : Appadurai Page 1 of 1

It is certified that error appears in the above-identified patent and that said Letters Patent is hereby corrected as shown below:

In the Specification

In column 9, line 46, before "home" delete "a".

Signed and Sealed this
Twenty-eighth Day of June, 2016

Michelle K. Lee
*Director of the United States Patent and Trademark Office*